United States Patent [19]

Morita

[11] Patent Number: 4,788,661
[45] Date of Patent: Nov. 29, 1988

[54] MICROCOMPUTER RESET CIRCUIT

[75] Inventor: Tetsuya Morita, Tokyo, Japan

[73] Assignee: Clarion Co., Ltd., Tokyo, Japan

[21] Appl. No.: 923,381

[22] Filed: Oct. 27, 1986

[30] Foreign Application Priority Data

Nov. 1, 1985 [JP] Japan .................................. 60-245358

[51] Int. Cl.$^4$ ............................................. G06F 11/00
[52] U.S. Cl. ................................ 364/900; 364/431.11;
364/483; 365/228
[58] Field of Search ... 364/200 MS File, 900 MS File,
364/431.11, 424, 483; 365/228

[56] References Cited

U.S. PATENT DOCUMENTS

| 4,205,376 | 5/1980 | Yoshida | 364/424 |
|---|---|---|---|
| 4,370,723 | 1/1983 | Huffman et al. | 364/483 |
| 4,410,938 | 10/1983 | Higashiyama | 364/200 |
| 4,541,050 | 9/1985 | Honda et al. | 364/424 |
| 4,580,220 | 4/1986 | Braun et al. | 364/431.11 |
| 4,587,939 | 5/1986 | Hemminger et al. | 123/479 |
| 4,629,907 | 12/1986 | Kosak | 307/265 |

Primary Examiner—Emanuel S. Kemeny
Assistant Examiner—Randy W. LaCasse
Attorney, Agent, or Firm—Wallenstein, Wagner, Hattis & Strampel, Ltd.

[57] ABSTRACT

A reset circuit controlled by a comparator circuit detecting the voltage of the power supply and incorporating a circuit which outputs reset pulses with a constant period and inhibits output of the reset pulses when it receives a reset inhibition pulse from a microcomputer.

4 Claims, 5 Drawing Sheets

MICROCOMPUTER RESET CIRCUIT

FIELD OF THE INVENTION

This invention relates to a reset circuit for a microcomputer used in particular in a stereo device, VTR, personal wireless apparatus, CD player, etc. for use on vehicle, whose power supply is unstable.

BACKGROUND OF THE INVENTION

Heretofore a circuit indicated in FIG. 5 has been utilized as a reset circuit for a microcomputer controlling audio devices for use in a vehicle. In this figure C and R represent a condenser and a resistance, respectively, and they are connected with the power source line L for the microcomputer CPU. This circuit is so constructed that, when the voltage +B of the power source fluctuates, its variations are detected by this C and R and a reset pulse is given to the reset terminal of the CPU. The number of parts of this circuit is small and cost merit is obtained. However, in this circuit, the waveform of the reset signal is unstable due to the manner of the voltage rise in a 5 V line and to instantaneous interruption of the 5 V line, which gives rise to erroneous operations of the microcomputer due to the fact that eventually it is not reset or it is reset several times. Further the reset circuit itself detects only variations in voltage at the 5 V line and it plays no role in protecting the microcomputer against entering abnormal states (uncontrollable run due to unsufficient reset).

Recently microcomputers are utilized more and more in various devices. As the number of their complicated functions increases, maintaining memory contents becomes more and more important and a one-way reset circuit detecting only variations in voltage in the power supply line has proven unsatisfactory. Further, in such a prior art circuit, whether a reset signal was produced or not dependedon the time constant of an RC circuit. There were often inconveniences in that the microcomputer was not restarted for the reason that no reset signal was produced by the reset circuit in circumstances where it should have been produced and in that the memory was destroyed by a reset signal produced when the microcomputer was not stopped.

OBJECT OF THE INVENTION

The object of this invention is to provide a reset circuit for a microcomputer in devices for use on vehicle, which can positively reset the microcomputer, in cases where the voltage of the power source and in particular the voltage of the power supply $V_{ACC}$ is used as the power source and it is instantaneously interrupted.

SUMMARY OF THE INVENTION

In order to achieve this object a microcomputer reset circuit according to this invention comprises a microcomputer having capability to output a reset inhibition pulse when the device controlled by it is not in the stop mode; a comparator comparing the voltage of the power source for the microcomputer with a reference voltage and outputting a predetermined signal to the microcomputer, when the former exceeds the latter; a reset pulse generator producing a reset pulse to the microcomputer; means for feeding the reset pulse generator with the voltage of the power source, responding to the predetermined signal coming from the comparator; and means for preventing the reset pulse generator from producing a reset pulse when the reset inhibition pulse is outputted.

The reset circuit always generates reset pulses with a predetermined constant interval. When a program is carried out normally in the microcomputer, it outputs pulses at its B terminal, which clears a timer in the reset pulse generator circit (inhibit the reset). In this way, when it be desired that the microcomputer be reset, it outputs no inhibition pulse and therefore the reset pulse generator circit outputs any number of reset pulses with a constant interval. In the case where the voltage of the power supply $V_{ACC}$ is instantaneously interrupted, if the microcomputer is restarted in a short time which is not detected, it is a matter of course that no reset signal is outputted.

DETAILED DESCRIPTION

Figure 1:
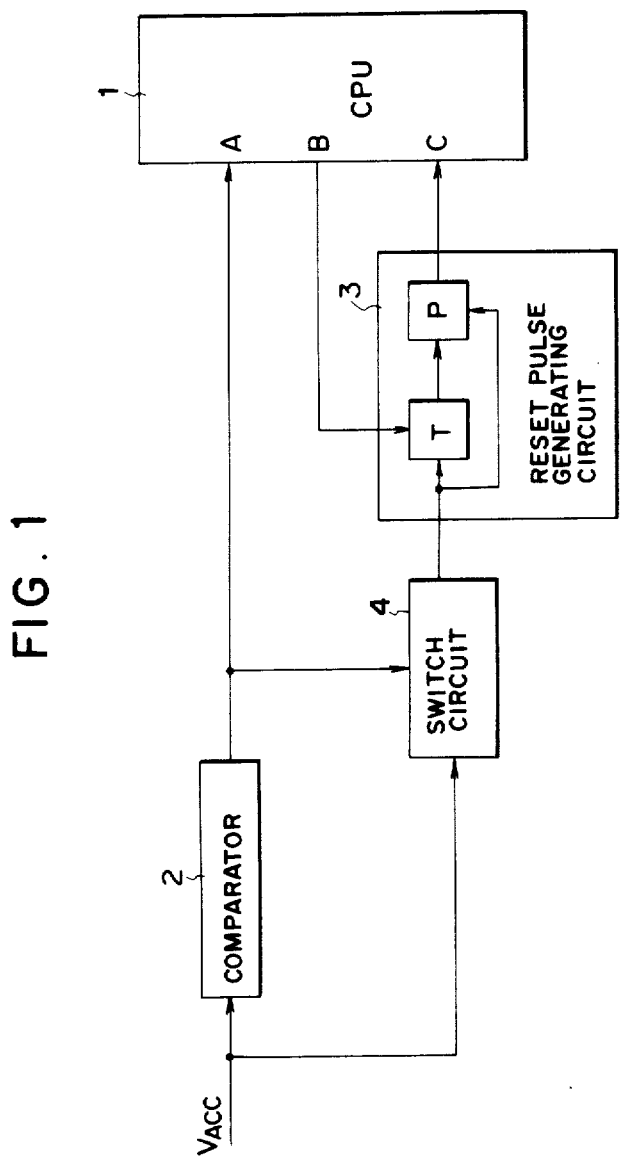
FIG. 1 is a block diagram illustrating the construction of a reset circuit for a microcomputer used in an audio device for use on vehicle according to this invention.

FIG. 1 is a block diagram illustrating the construction of a reset circuit for a microcomputer used in an audio device for use on vehicle according to this invention, in which the reference numeral 1 represents a microcomputer, 2 a comparator, 3 a reset pulse generator, and 4 a switching circuit. The output of the comparator 2 is connected with the input terminal A monitor to the voltage of the power source $V_{ACC}$ in the microcomputer 1. In addition, the reset circuit 3 consists of e.g. a timer T and a pulse generator P, and the timer T is connected with the inhibition terminal B of the microcomputer 1. When $V_{ACC}$ exceeds a predetermined voltage (normally 8 V), the comparator 2 outputs a "low" signal to the microcomputer 1 and thus it normally works. Further the switching circuit 4 is switched on by the "low" signal and the reset circuit 3 is fed with the voltage. When the reset pulse generator circuit 3 is fed with the voltage, the timer T is started. In this state, when a certain period of time (about 400 ms) elapses, the pulse generator P outputs pulses having a constant width. Furthermore the timer T is cleared, every time a reset inhibition pulse arrives at the inhibition terminal B.

Whether the microcomputer 1 works normally or not depends on whether the timer T in the microcomputer 1 works or not. This timer T may be provided in the form of a hardware, but its function is realized normally by means of software provided in the microcomputer 1. In this embodiment also the same function as that of the timer is obtained by means of software and the reset inhibition pulse is switched on and off in this timer rountine.

Then, when the voltage of the power source $V_{ACC}$ is instantaneously interrupted, independently of the point of time where it occurs, no reset inhibition pulse is outputted if the microcomputer 1 is in the stop mode at the point of time where $V_{ACC}$ is reestablished, because the timer also doesn't work. Consequently a certain period of time after the reestablishment of $V_{ACC}$ a reset signal is outputted by the reset pulse generator circuit 3. Further, even if $V_{ACC}$ is instantaneously interrupted, if the microcomputer is not in the stop mode, since as a matter of course the timer works, reset inhibition pulses are continuously outputted and no reset signal is outputted.

Figure 6:
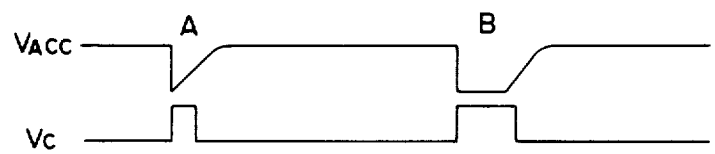
FIG. 6 is a scheme indicating voltage waveforms for explaining the working mode of the reset circuit indicated in FIG. 1.

Suppose now that $V_{ACC}$ fluctuates as indicated by A and B in FIG. 6. The microcomputer 1 monitors the input waveform $V_c$ which has passed through the comparator 2. Suppose also that for the fluctuation indicated by A the fall of $V_{ACC}$ cannot be detected. In this case, since the software program which is incorporated within the microcomputer at this time continues to be carried out, if a reset signal is inputted, the content of the memory accessed at this moment is often destroyed. On the other hand, in the embodiment described above, since the reset inhibition pulse clears the timer T, the inconvenience stated above is avoided. Further, in the case B, suppose that the microcomputer 1 detects the fall of $V_{ACC}$ and enters into the stop mode. Since $V_{ACC}$ rises just thereafter and the microcomputer 1 should begins again to carry out the software, it requires a reset input. In this case, since no reset inhibition pulse is given to the timer T, a reset pulse is inputted in the microcomputer 1. These durations of the voltage drops indicated by A and B depend on the software used, but there are many cases where they are not constant. Even if they are constant, whether the phenomenon indicated by A or the phenomenon indicated by B occurs depends on where the instantaneous interruption begins in the software. To the contrary, according to this invention, these are no problems produced, as explained above.

Figure 2:
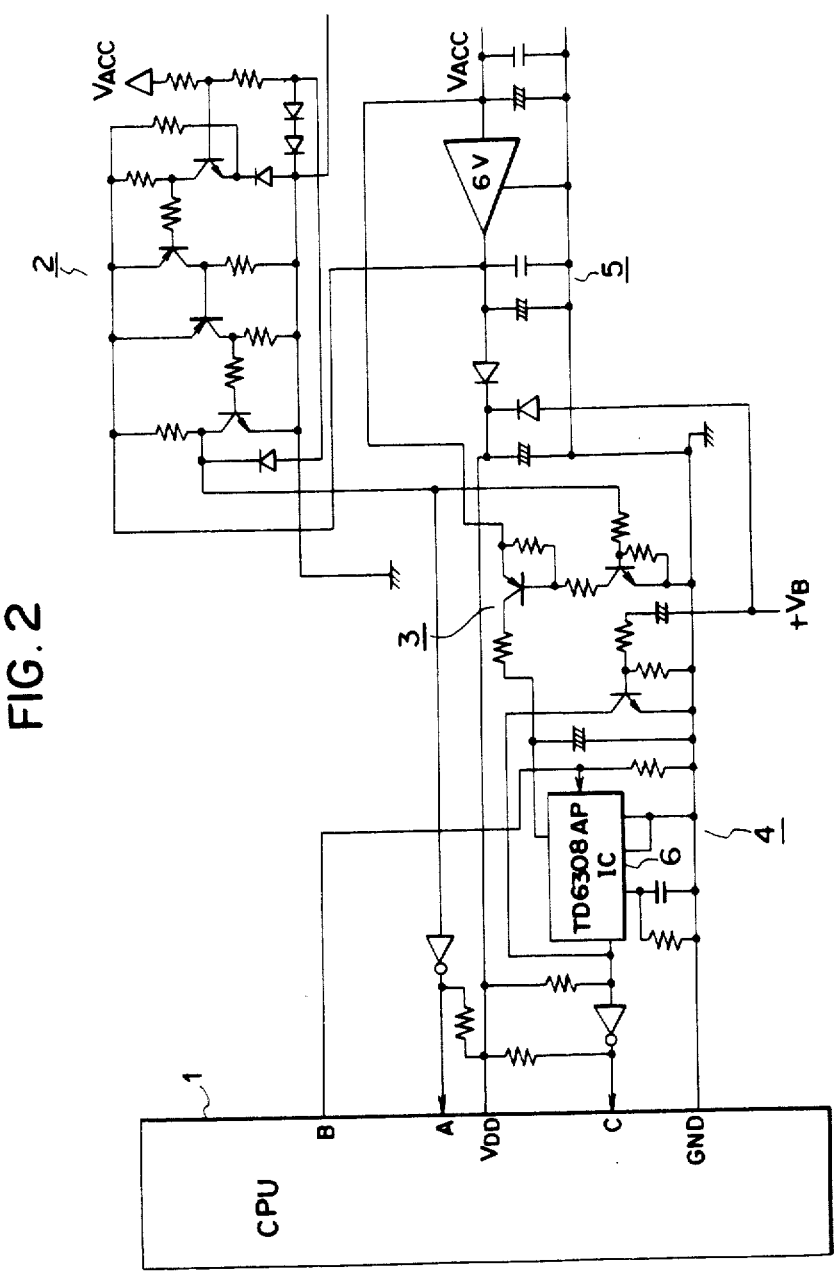
FIG. 2 is a circuit diagram in practice of a reset circuit according to this invention.

FIG. 2 is a circuit diagram showing a reset circuit according to this invention. In this figure the same reference numerals as those in FIG. 1 represent the same circuits and an IC circuit 6 has the function of the timer T and that of the pulse generator P. In addition, $+V_B$ is a backup voltage and given e.g. by a battery mounted in the vehicle.

Figure 3:
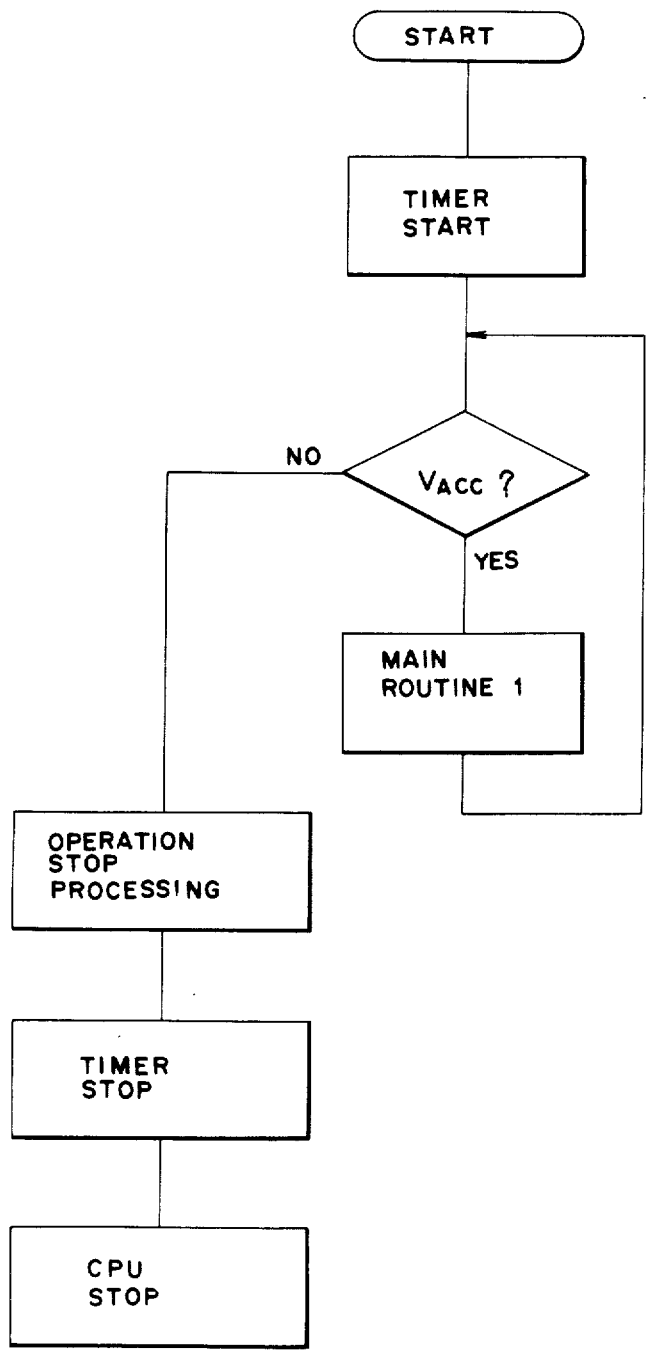
FIGS. 3 and 4 are flow charts indicating the working mode of the microcomputer in the case of a reset condition and in the case of an instantaneous interruption condition, respectively.
Figure 4:
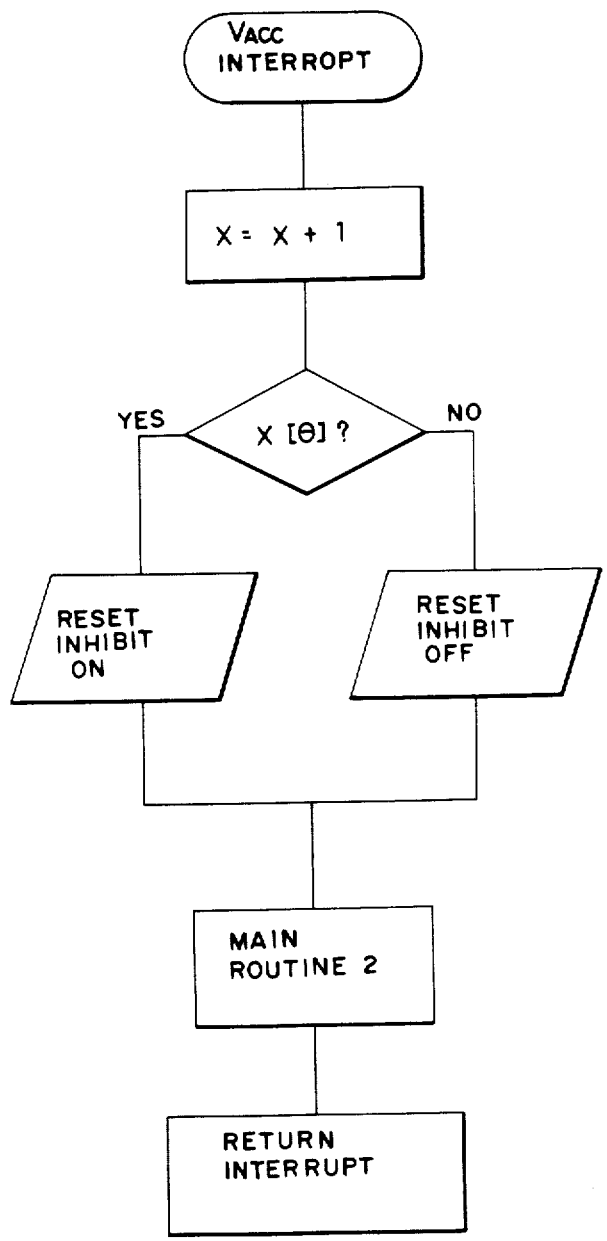
Figure 5:
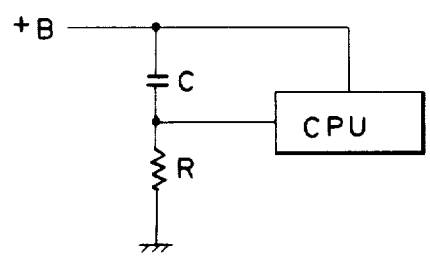
FIG. 5 is a block diagram illustrating a prior are reset circuit.

FIGS. 3 and 4 are flow charts indicating the working mode of the microcomputer in the case of a reset and in the case of an instantaneous interruption, respectively. The instantaneous interruption routine is called with a constant time interval (5 ms in this embodiment) during the working of the timer. X in the instantaneous interruption routine is a 4-bit binary number and its least significant bit (X[0]) is successively turned on/off by adding 1 repeatedly.

As can be seen from these flow charts, the voltage of the power source $V_{ACC}$ is detected at one point and an instantaneous interruption can be either detected or not detected. However, when a "low" is detected at a point of time where $V_{ACC}$ becomes "high"→"low"→"high", since the timer by means of the software incorporated within the microcomputer 1 and the central processing unit are stopped, the reset inhibition pulse appearing at the terminal B is kept always to be "low". Consequently the reset pulse generator circuit works; after a certain period of time a reset pulse is outputted; after having been once reset, the central processing unit is started; and the timer by means of the software is also started. In this way, a reset inhibition pulse is outputted by the inhibition terminal B and after this moment no reset pulse is outputted.

As explained above, according to this invention, since, when it is desired that the microcomputer is reset, it outputs no inhibition pulse, a positive reset can be effected, because the reset circuit outputs any number of reset signals with a constant interval. Thus this invention is specifically efficacious, in the case where the power supply mounted on a vehicle and having fluctuations in output voltage is utilized as the power source for the microcomputer.

The embodiments of the invention in which an exclusive property or privilege is claimed are defined as follows:

I claim:

1. A reset circuit for resetting the operation of a microcomputer operating according to a program stored therein comprising:
    a reset pulse generator for outputting reset pulses to said microcomputer; and
    a timer for establishing a first time interval when said reset pulse is to be produced and acting on said reset pulse generator to produce said reset pulse at the end of said first time interval, said microcomputer including program-controlled means for periodically providing a reset inhibiting pulse within a second time interval shorter than said first time interval in normal execution of said program and outputting said reset inhibiting pulse to said timer to reset the operation thereof so that failure of said microcomputer to output a reset inhibiting pulse within said first time interval resets said microcomputer.

2. A reset circuit as claimed in claim 1 further comprising a power source supplying power to said microcomputer; and
    control means for producing a voltage variation signal in response to variation in the voltage of said power source and wherein said microcomputer periodically produces the reset inhibiting pulse and does not produce it when the microcomputer receives the variation signal and then recognizes the undesired variation of said power source.

3. A reset circuit as claimed in claim 2 wherein said control means includes a comparator outputting the voltage variation signal when said power source voltage exceeds a reference voltage.

4. A reset circuit as claimed in claim 2 further including a switch circuit for connecting the power source to said timer in response to the voltage variation signal.

* * * * *